Nov. 8, 1966   C. H. W. POLZIN ETAL   3,284,103
TORQUE ARM
Filed March 19, 1965   2 Sheets-Sheet 1
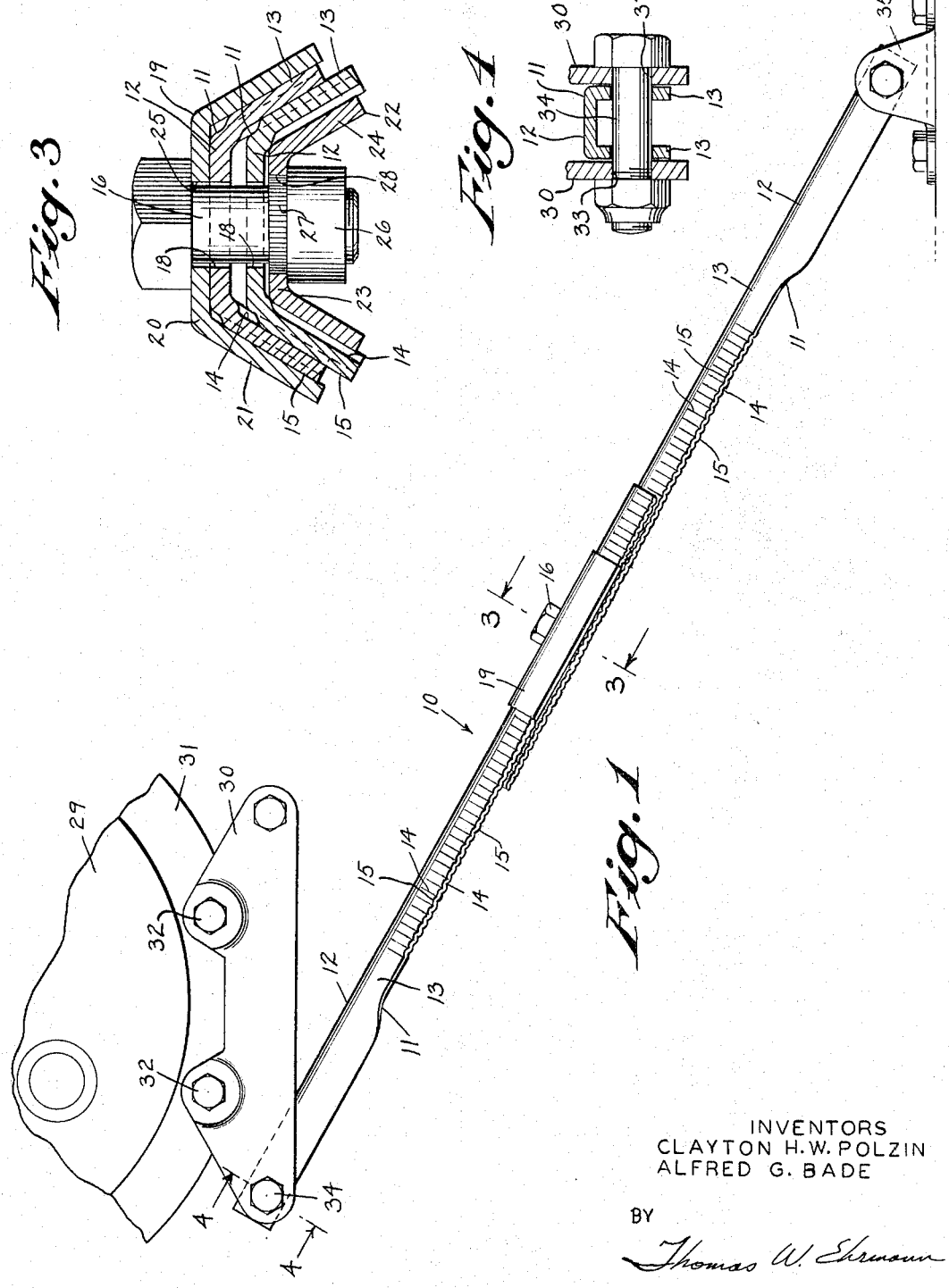
INVENTORS
CLAYTON H. W. POLZIN
ALFRED G. BADE
BY
Thomas W. Ehrmann
ATTORNEY Nov. 8, 1966 C. H. W. POLZIN ETAL 3,284,103
TORQUE ARM
Filed March 19, 1965 2 Sheets-Sheet 2
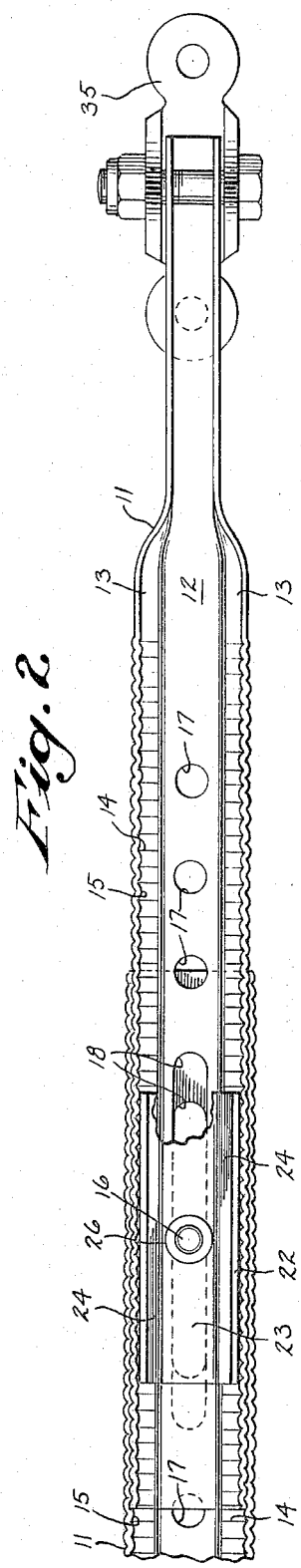
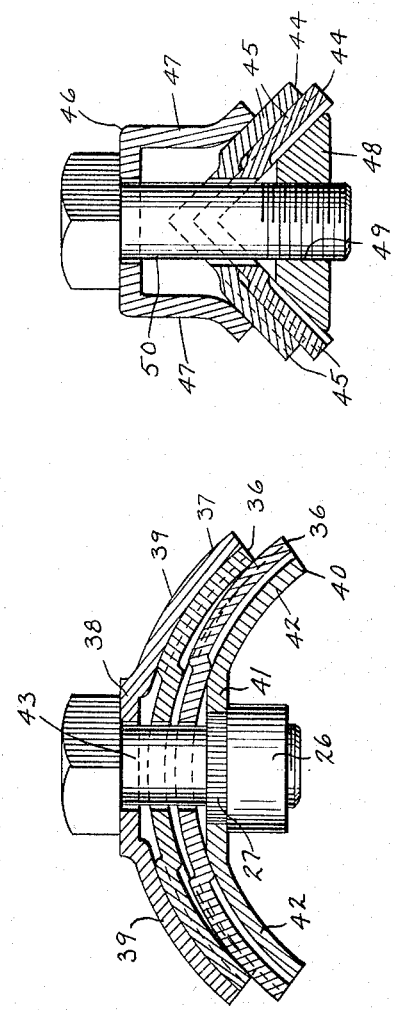
INVENTORS
CLAYTON H.W. POLZIN
ALFRED G. BADE
BY *Thomas W. Ehrmann*
ATTORNEY

3,284,103
TORQUE ARM

Clayton H. W. Polzin, Milwaukee, and Alfred G. Bade, Brookfield, Wis., assignors to The Falk Corporation, Milwaukee, Wis., a corporation of Wisconsin
Filed Mar. 19, 1965, Ser. No. 441,128
1 Claim. (Cl. 287—58)

This invention relates to torque arms, and particularly to an improved adjustable torque arm for connecting a shaft mounted speed reducer to a fixed anchorage.

The weight of a shaft mounted speed reducer is borne by the shaft upon which it is mounted. However, the considerable torque reaction loads developed by such speed reducers during their operation cannot be carried by the mounting shaft. Rather, torque arms are commonly used to carry such torque reaction loads by providing a rigid connection between the speed reducer and a fixed anchorage. These torque arms are generally made adjustable in their length so that the angular position of the speed reducer can be varied relative to the mounting shaft after the speed reducer has been mounted and connected to a driving motor.

Heretofore, torque arms have commonly been constructed with turnbuckles joining pairs of threaded rods that are connected at their ends to the speed reducer and fixed anchorage. Such torque arms are relatively expensive to manufacture because of the machining necessary to form the screw threads. Since the torque reaction loads must be carried by the mating screw threads of the rods and turnbuckles, relatively heavy sections of rods and turnbuckles are required to provide threads of the necessary capacity. The result is inefficient use of materials.

It is a principal object of this invention to provide an improved adjustable torque arm that is of simple construction and that is economical to manufacture.

It is another object of this invention to provide an improved torque arm formed of a pair of identical arm members that can form torque arms of a wide range of lengths and thereby reduces inventory requirements.

It is also an object of this invention to provide an improved adjustable torque arm having greater rigidity than torque arms heretofore known.

In accordance with the invention, a torque arm is provided that is formed of a pair of arm members each adapted to be pivotally secured at one end to a respective one of the speed reducer and fixed anchorage. The other end of each arm member is formed with spaced, diverging sides extending outwardly from a crest and the arm members are adapted to be nestled one within the other. The diverging sides are provided with transverse striations forming undulating surfaces that engage when the arm members are nestled. Releasable means are provided for clamping the arm members in their nestled position and adjustment is achieved by releasing such means and resetting the same after the arm members are moved lengthwise with respect to each other.

The foregoing and other objects and advantages of the invention will appear in the description which follows. In the description, reference is made to the accompanying drawings which form a part hereof. The drawings illustrate several embodiments of the invention and these embodiments will be described in sufficient detail to enable those skilled in the art to practice the invention. Since changes can be made in the embodiments without departing from the scope of the invention, the description should not be taken in a limiting sense.

In the drawings:

FIG. 1 is a side view in elevation of one embodiment of torque arm in accordance with the invention, and the torque arm is illustrated as being connected between a speed reducer and a fixed anchorage;

FIG. 2 is a bottom plan view of a portion of the torque arm of FIG. 1 on an enlarged scale and with the torque arm removed from the speed reducer and fixed anchorage;

FIG. 3 is an enlarged view in vertical section taken in the plane of the line 3—3 of FIG. 1;

FIG. 4 is an enlarged view in vertical section taken in the plane of the line 4—4 of FIG. 1;

FIG. 5 is a view in vertical section similar to FIG. 3 but illustrating another embodiment of the invention; and FIG. 6 is a view in vertical section also similar to FIG. 3 but illustrating still another embodiment of the invention.

Referring now to the drawings and particularly to the embodiment of FIGS. 1–4, the torque arm 10 is comprised essentially of a pair of identical arm members 11. Each of the arm members 11 is formed of relatively thin section sheet metal that is stamped to form a flat crest 12 and a pair of spaced, straight sides 13 that extend from the crest 12. Adjacent one end of each of the arm members 11, the sides 13 are formed parallel and normal to the crest 12 to result in a channel shaped mounting end. Adjacent the other end of each arm member 11 and extending along a substantial portion of the length thereof, the sides 13 diverge outwardly from the crest 12 to form a generally U-shaped cross section with flared sides 13 (see FIG. 3).

The diverging sides 13 are provided with parallel transverse striations forming alternating valleys 14 and ridges 15 in both the inner and outer lateral surfaces of the sides 13. The striations form an undulating pattern in the diverging sides 13.

The arm members 11 are nestled one within the other to have the striations of the diverging sides 13 of one arm member 11 engage with the striations of the sides 13 of the other arm member. The arm members 11 are held in such nestled position by clamp means including a headed bolt 16 received through spaced holes 17 and elongated slots 18 provided in the crests 12. Referring to to FIG. 3, an outer clamp member 19 is formed with a flat base 20 and spaced diverging sides 21 that lie over and contacts the ridges of the outer surface of the outermost one of the arm members 11. An inner clamp means 22 forming a part of inner clamp and nut means is similarly provided with a flat base 23 and diverging sides 24. The inner clamp plate 22 is so formed as to have its sides 24 bear against the ridges 15 on the inner lateral surface of the innermost one of the arm members 11 while its base 23 is spaced slightly from the crest 12 of the arm member 11.

The bolt 16 is received through a hole 25 in the outer clamp member 19 and through the aligned slots 18 or holes 17 in the arm members 11. A cylindrical nut 26 completes the inner clamp and nut means and is formed with a reduced diameter portion 27 that is serrated and press fitted into an opening 28 provided in the inner clamp member 22 to form an inner clamp and nut assembly. Such assembly is threadedly received on the projecting bolt 16.

The torque arm 10 is particularly adapted for connection between a shaft mounted speed reducer and a fixed anchorage. In FIG. 1, a portion of a shaft mounted speed reducer 29 is shown. The speed reducer 29 may be of the type in which housing halves are joined together by bolts passing through opposing flanges. In FIG. 1, a mounting bracket 30 is shown on one side of such a mounting flange 31 and a similar mounting bracket would be provided on the opposite, hidden side of the flange 31. The brackets are secured in their spaced apart relation by bolts 32 that also function to hold together the housing halves. The parallel sides 13 of the mounting end of the arm members 11 are provided with transverse openings 33 that receive bolts 34 journaled in the mounting brackets 30 to provide a pivotal mounting. For connection to the fixed anchorage a clevis bracket 35 may be provided that is firmly bolted to a rigid support and that receives and pivotally mounts the mounting end of the other arm member 11.

To install the torque arm 10, the mounting ends of the arm members 11 may first be pivotally connected within the mounting brackets 30 and clevis bracket 35. The arm members 11 can then be brought together to nestle one within the other. The outer clamp member 10 would be placed upon the outermost arm member 11 and the inner clamp member 22, with the nut 26 already installed therein, is placed within the innermost arm member 11. Finally, the bolt 16 is inserted and the bolt 16 and nut 26 tightened to have the bolt head bear against the outer clamp member 19 and the shoulder formed by the reduced diameter portion 27 of the nut 26 bear against the inner clamp member 22 thereby clamping together the nestled arm members 11. The ridges 15 and valleys 14 of the opposing surfaces of the arm members 11 will engage and provide the load carrying capacity for the torque reaction loads.

Since the torque arm 10 is pivotally mounted at its ends, the loading will be axial either in compression or tension. The mating valleys 14 and ridges 15 of the arm members will be loaded in shear and the shear loading will ideally occur over the entire overlapping portions of the arm members 11. By carrying the torque reaction loads in shear on the striations, the bolt 16 is relieved of shear loading and is loaded only in tension. The cross sectional configuration of the arm members 11 will prevent buckling of the torque arm 10 under compressive loads within the capacity of the torque arm.

Adjustment of the length of the torque arm 10 is accomplished simply by loosening the bolt 16 and nut 26 and sliding the nestled arm members 11 until the desired length is obtained. Once the limits of the elongated slots 18 have been reached, it is necessary to align the holes 17 to receive the bolt 16.

In FIG. 5 there is shown a second embodiment of the invention in which the striated portion of each arm member 36 is formed as a segment of a circular cylinder. As with the embodiment of FIGS. 1–4, the striated sides diverge outwardly from the crest of the arcuate shaped arm member 36. An outer clamp member 37 is formed with a flat base 38 and spaced diverging sides 39 that are segments of a circular cylinder and are adapted to lay over and contact the outermost arm member 36. An inner clamp member 40 also formed with a flat base 41 and diverging sides 42 that are segments of a circular cylinder, contacts the innermost arm member 36 and receives the nut 26 with with its serrated portion 27 to form inner clamp and nut means. The nut 26 is threadedly received on a headed bolt 43 that passes, with clearance, through openings in the outer clamp member 37 and arm members 36.

A further embodiment of the torque arm is shown in FIG. 6. In this embodiment the striated portion of each of two identical arm members 44 is formed as an angle with straight sides 45 diverging outwardly from the crest which is the apex of the angle. An outer, generally U-shaped clamp member 46 has the ends of its parallel sides 47 flared outwardly and bearing against the outermost arm member 46. Instead of using a clamp member and separate nut to form the inner clamp and nut means an inner clamp member and nut 48 having a trapezoidal cross sectional configuration is provided with a threaded bore 49 that receives a bolt 50. The non-parallel sides of the clamp member and nut 48 bear against the innermost one of the arm members 44 to clamp together the arm members 44.

In the embodiments of FIG. 5 and 6, the mating ridges and valleys of the nestled arm members again carry the axial torque reaction loads. The arcuate cross sectional configuration of the embodiment of FIG. 5 and the angular cross sectional configuration of the embodiment of FIG. 6 prevents buckling of the torque arms under compressive loads. Both of the alternate embodiments would be formed with channel shaped mounted ends for pivotal mounting to the speed reducer and fixed anchorage.

From the foregoing it will be appreciated that the applicants have provided a simple but effective torque arm. The arm members and clamp members can be economically formed by press operations. The use of identical arm members considerable reduces inventory requirements. And the torque arm is rigid even though fully adjustable.

We claim:

In an adjustable torque arm for connection between a shaft mounted speed reducer and a fixed anchorage, the combination comprising: a pair of identical elongated arm members each having a longitudinal crest and a pair of spaced longitudinal sides extending from said crest, the sides of each arm member being parallel adjacent one end of said arm member to form a mounting end and being provided with aligned openings for pivotal attachment to one of said speed reducer and fixed anchorage, the sides of each arm member diverging outwardly adjacent the other end of said arm member and along a substantial length of said arm member, said diverging sides being provided with longitudinally undulating lateral surfaces defined by series of alternating transverse ridges and valleys of substantial depth, said crests having longitudinally spaced openings, and said arm members being nestled one within the other to have lateral surfaces of said diverging sides in contact and with said mounting ends extending in opposite directions; an outer clamp member disposed to bear against said diverging sides of the outermost one of said nestled arm members; a headed bolt extending through said outer clamp member and said openings in said crests; and inner clamp and nut means threadedly received on said bolt and bearing against said diverging sides of the innermost one of said arm members.

References Cited by the Examiner

UNITED STATES PATENTS

| | | | |
|---|---|---|---|
| 1,445,239 | 2/1923 | Reddig | 248—354 X |
| 1,652,677 | 12/1927 | McCoy et al. | 287—58 |
| 2,658,241 | 11/1953 | Houghton et al. | 52—632 |
| 2,775,805 | 1/1957 | Sands. | |
| 3,000,420 | 9/1961 | Spokes | 151—41.73 |
| 3,056,507 | 10/1962 | Squires et al. | 189—56 |
| 3,062,573 | 11/1962 | Roecker | 287—103 |
| 3,102,616 | 9/1963 | Simpkins | 189—36 |

CARL W. TOMLIN, *Primary Examiner.*

T. A. LISLE, *Assistant Examiner.*